July 8, 1958   F. J. DUMANOWSKI   2,841,943
QUICK ATTACHING FORAGE HARVESTER

Filed Nov. 2, 1953   3 Sheets-Sheet 1

INVENTOR:
Ferdinand J. Dumanowski
By: Emerson B Donnell
Atty.

July 8, 1958     F. J. DUMANOWSKI     2,841,943
QUICK ATTACHING FORAGE HARVESTER Filed Nov. 2, 1953     3 Sheets-Sheet 2

INVENTOR:
Ferdinand J. Dumanowski
By: Emerson B Donnell
Atty.

July 8, 1958 F. J. DUMANOWSKI 2,841,943
QUICK ATTACHING FORAGE HARVESTER

Filed Nov. 2, 1953 3 Sheets-Sheet 3

INVENTOR:
Ferdinand J. Dumanowski
By: Emerson B Donnell
Atty.

United States Patent Office 2,841,943
Patented July 8, 1958

2,841,943

QUICK ATTACHING FORAGE HARVESTER

Ferdinand J. Dumanowski, Davenport, Iowa, assignor to J. I. Case Company, Racine, Wis., a corporation of Wisconsin Application November 2, 1953, Serial No. 389,619

8 Claims. (Cl. 56—16)

This invention pertains to a forage harvester and, more especially, it pertains to a forage harvester having a base unit suitable for attaching to various forage gathering units.

To fully appreciate the merit of this invention, brief mention will be made of the prior art and the problems encountered therewith. Harvesters of the preferred present design generally comprise two units, the forage gathering unit and the base unit. The gathering unit may be of different designs suitable, for example, for either row cropping or pickup work. The base unit is preferably of only one design suitable for processing forage from either type of aforementioned gathering units.

Heretofore, the harvester base unit and gathering unit were attached in synchronized operating relation by means of a drive chain with a plurality of bolts serving to physically connect the two units. Then, when it was desired to interchange gathering units, a laborious and time consuming job was required. The drive chain, supplying power from the base unit to the gathering unit, was necessarily enclosed throughout most of its length and therefore inaccessible. Further, whatever short length of the chain was accessible, the section where the chain could be readily disassembled was probably not exposed. In addition to this, a plurality of bolts had to be removed and the pickup unit beater roll adjustment and pivot bar also had to be detached from the base unit. Of course after the chain was freed from the attached gathering unit and the detachment completed, then the other gathering unit had to be attached by performing the laborious job in a reverse order. Several hours were usually required to make the complete interchange of gathering units.

In conformance with the present invention, the interchange of gathering units can be accomplished in a substantially more facile manner and a corresponding considerably shorter period of time. Where the time required was formerly several hours, with the present invention the interchange can now be made in a matter of minutes.

It is therefore an object of this invention to provide a forage harvester having interchangeable gathering units which can be quickly and easily interchanged.

It is a further object of this invention to provide a forage harvester which requires that a minimum number of connections exist between the base unit and the gathering unit. Naturally it is desired that satisfactory driving and physical connections exist therebetween while pursuing this object of providing a minimum number of connections.

Other objects and advantages will become more apparent upon reading the following description with reference to the accompanying drawings wherein, Fig. 1 is a perspective view of a forage harvester embodying this invention and showing the base unit and the forage gathering unit detached and spaced apart.

Similar reference numerals refer to the same parts throughout the several views.

Figure 1:
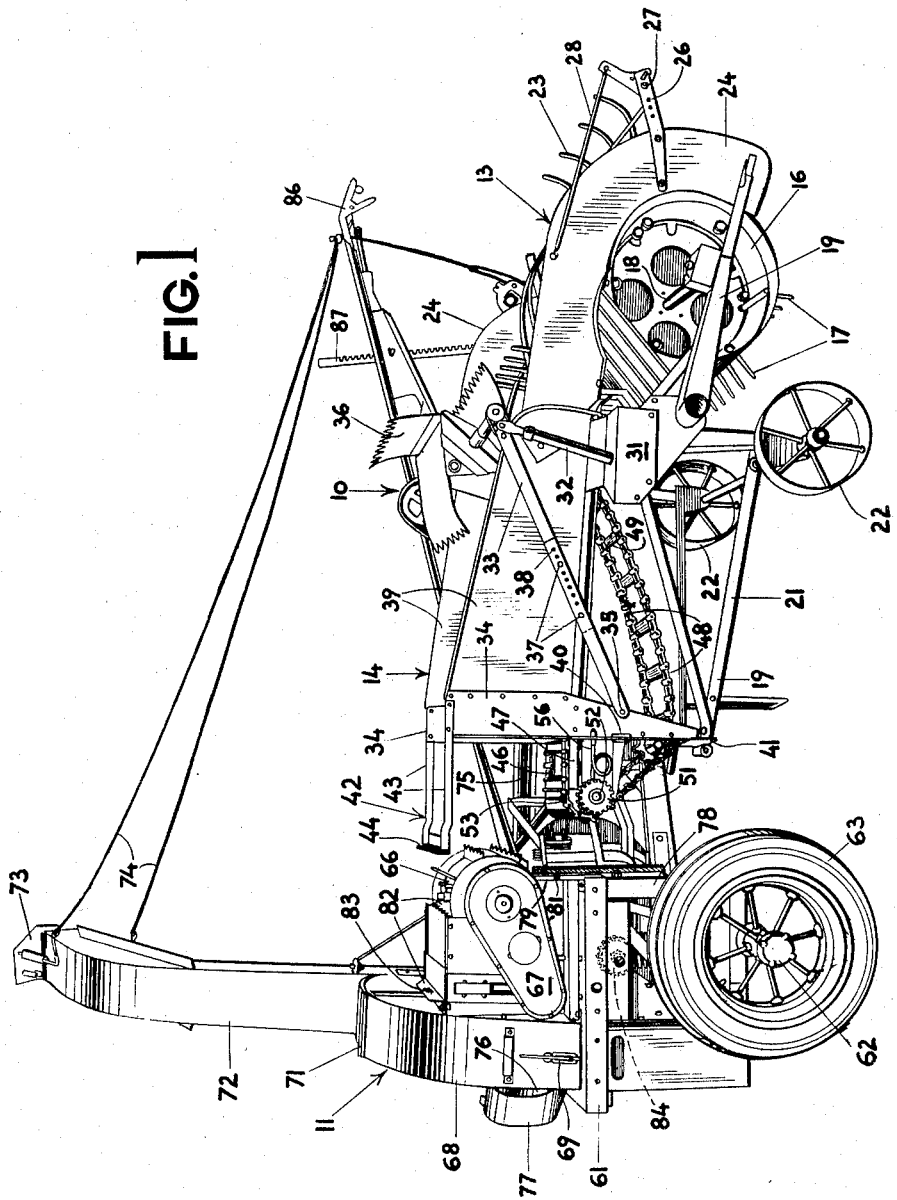

As shown in Fig. 1, there is provided a forage harvester consisting of a forage pickup or gathering unit generally designated 10 and a base unit generally designated 11. These units are shown in a disassembled and spaced apart position to facilitate a clear understanding of this invention. It should be further understood that this invention is adaptable to a tractor powered or self powered type of harvester.

The pickup unit 10 consists of a forwardly located drum assembly 13 and a rearwardly attached feed table assembly 14. Included in the drum assembly 13 is a rotatably mounted forage pickup drum 16 containing a plurality of tines 17 extending radially from the surface of the drum to pick up the forage as the harvester advances along the ground with the drum rotating counterclockwise as seen in Fig. 1. The drum itself is supported on a shaft 18 which in turn is mounted on a pickup unit frame 19. Also shown in Fig. 1 is a carriage 21 with wheels 22 to facilitate mobility of the pickup unit 10 while it is being attached to the base unit 11. Since it is not an integral part thereof, in actual operation the carriage 21 is removed from the harvester.

Mounted above the drum 16 on the pickup unit is a wind guard 23 which is pivotally mounted on a pair of flare sheets 24 attached to opposite sides of the pickup unit. The wind guard and flare sheets 24 guide the forage past the pickup drum 16. A support arm 26 extends from the flare sheet 24 to provide the actual pivot mounting at 27 for the wind guard 23. Also, a coil spring 28 connects to the wind guard to maintain it in a general position as shown.

The operation of the foregoing described parts of the pickup unit drum assembly 13 gathers forage during the forward movement of the harvester. The forage is then passed to the feed table assembly 14. A feed table bracket 31 is mounted on the side of the feed table to provide a base for an upright support bar 32 which in turn is pinned at its upper end to a pivot bar 33. One end of pivot bar 33 is pivotally pinned at 35 onto an angle plate or post 34 which is attached to the rear of the feed table assembly 14. The opposite end of bar 33 rotatably supports a beater roll 36. With this construction, it will be seen that the beater roll is pivotally mounted to move up and down in response to the changes in volume of the forage passing thereunder. The beater roll 36, through its pivot bar 33 is then mounted on the pickup unit alone and is removable therewith without disturbing its adjustment or relation to the pickup parts. Also, it should be noted that the pivot bar 33 is made in two pieces and is therefore adjustable and secured by positioning of bolts 37 which maintain the bar after the two pieces are aligned axially with the bolts passing through the holes 38.

To further guide the forage along the feed table there is provided a pair of sheets 39 mounted on opposite sides of the table to form a continuation of sheets 24. As previously mentioned, an angle plate 34 is attached to the rear of the pickup unit and it should be noted that there is one plate 34 on each side thereof in a vertical position. The lower ends of the plates 34 are connected with an angle bar 41 which extends transversely between the plates. Attached to each of plates 34 is a lateral extension plate 40 which is for a purpose hereinafter explained. At the upper ends of the plates 34 there is preferably provided a horizontally extending frame 42 which projects rearwardly of the pickup unit 10. It should be understood that the frame 42, comprised of a pair of arms 43 and a transversely connecting brace 44, the plates 34, and the angle bar 41 all form an integral part of the structure of the pickup unit 10.

Also projecting rearwardly on the pickup unit 10 is a forage conveyor 46 supported on a frame 47. The conveyor 46 as shown is of the type having a pair of spaced apart endless chains 48 with slats 49 extending therebetween. The conveyor 46 operates in a manner to deliver forage from the front to the rear of the pickup unit 10 and into the base unit 11 through the previously described opening between posts 78.

To drive the conveyor 46 there is provided a gear 51 mounted on a shaft 52 which is rotatably mounted on the frame 47 transversely and rearwardly with respect to the conveyor 46. A chain sprocket 53 is mounted on shaft 52 to be spaced inwardly from the gear 51. The sprocket 53 engages the conveyor chain 48 to form the drive connection therewith. It should be understood that the conveyor shown is only a preferred type, and other types of crop handling mechanism conveyors or means for passing forage can also be used within the purview of this invention.

Also mounted on the pickup unit is an oil line 56 which extends from outside the plate 34 to the shaft 52 to oil the latter in its bearing.

Figure 2:
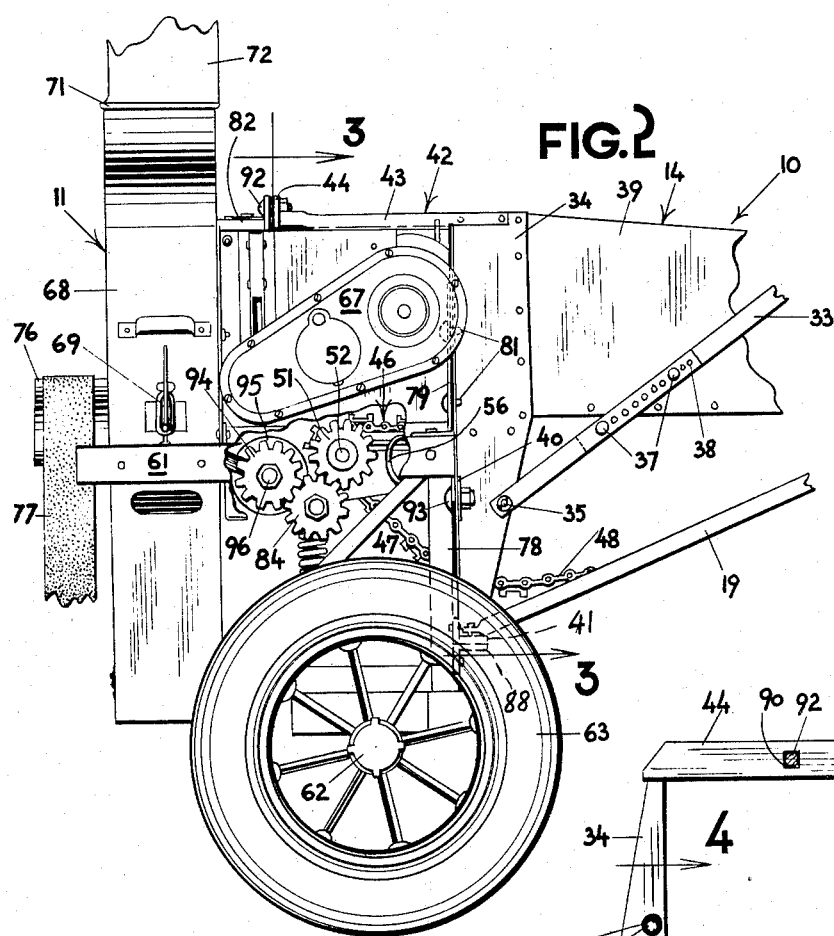
Fig. 2 is a side elevation of the harvester shown in Fig. 1 but showing the units in assembled relation, with parts broken away.

The base unit 11 shown in Fig. 1 consists of a frame 61 with an axle 62 and a pair of wheels 63 forming the carriage of the unit. Provided in a forward location on the base unit is an intermediate forage feed roll 66 which receives the forage from the pickup unit conveyor 46. A chain shield 67, attached to the side of the base unit, protects the intermediate feed roll drive chain (not shown). Thus the unit 11 contains a forage receiving section located across the front end of the unit and between the roll 66 and the conveyor 46, in well-known manner as shown in Fig. 2.

Mounted on the rear of the base unit 11 is a blower housing 68 which encloses a fan and a cutter wheel, neither of which is shown. It will be noted that the housing 68 is provided with a latch assembly 69 and a hinge 71 to enable the housing to be readily opened. A forage delivery pipe 72 extends upright from a side of the housing 68 to enable the forage to be finally blown into a truck or elsewhere thereby completing the harvesting. The discharge end of the pipe 72 has an adjustable deflector 73 controlled by manipulation of a rope attached thereto so that the operator can direct the delivery of forage as desired.

On the extreme rear of the base unit 11, a driven pulley 76 is mounted to be driven by a flat belt 77. In the base unit shown, this pulley drives the blower and cutter wheel. The belt 77 actually is driven through a well known type of propeller shaft which is not shown but which extends along the side of the harvester from the tractor (not shown) and is enclosed by a shield 75.

Mounted forwardly and upright on the base unit 11 is an angle bar or post 78. It should be understood that a post 78 is on each side of the unit 11 and securely attached to the frame 61. Also, a plate 79 is attached to each side of the base unit 11 in an upright position but located slightly above post 78. A pair of alignment pins 81 is securely connected onto each of the plates 79 to project therethrough toward the pickup unit 10. These pins can be secured by a press fit or by welding to the bar 79, see Fig. 4. The bars 78, plates 79, and pins 81 are for a purpose which will be described hereinafter, and the posts 78 are spaced apart laterally as related to the direction of progress of the machine to provide therebetween a forwardly directed crop receiving opening.

Located on the top and toward the middle of the base unit 11 is an upper angle bar 82 which is securely mounted on the unit and contains a bolt hole 83 in the center thereof.

Mounted near the center line of the base unit 11 is an idler spur gear 84 which is driven by a driving gear not shown in Fig. 1, see Fig. 2.

Also a part of the base unit 11 is the tilting lever 86 extending considerably to the front of the unit to be accessible to the driver of the tractor. Through lever 86 the harvester can be tilted to a desired angle relative to the ground. A quadrant or rack 87 maintains the lever 86 and the harvester at the set angle as the quadrant is supported at its base on the tractor drawbar, not shown.

In normal operation of the forage harvester described, the pickup unit 10 is rigidly or in effect integrally attached to the base unit 11 with the entire assembly being pulled by a tractor. Fig. 2 shows the important parts of the invention of this harester when it is assembled for operation. There it is seen that the front of the base unit connects with the rear of the pickup unit. Also, it should be understood that this relation is obtained by moving the two units together from their respective positions shown in Fig. 1.

Figure 3:
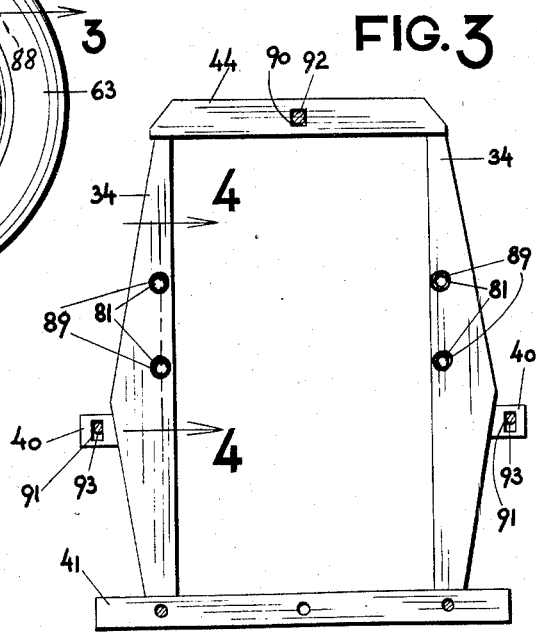
Fig. 3 is a sectional view taken on the line 3—3 of Fig. 2.
Figure 4:
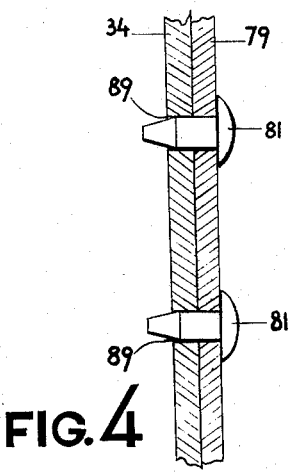
Fig. 4 is a sectional view taken on the line 4—4 of Fig. 3.

In so assembling these units, the pickup unit, on its carriage 21, is preferably moved to the base unit. Here the alignment pins 81 are received by four openings 89 spaced to register with said pins after angle bar 41 is rested upon a support member 88, Fig. 2, mounted on the base unit 11 to align pins 81 with the openings 89 located in the pickup unit plates 34, as seen in Figs. 2, 3 and 4. In making this connection, it should be understood that plates 34 are mating matching plates or portions with respect to the front of the base unit and especially with respect to angle plates 78 and 79 which are thus also mating matching plates or portions. Another part of the matching relation between the units is that of the extension plates 40 which align with the base unit posts 78. It should be obvious that plates 34 and extension plates 40 could be one continuous piece instead of two attached pieces as shown. Also, the conveyor 46 and driven gear 51 extend into the above-described crop receiving opening in the base unit to the distance shown in Fig. 2 and as indicated in Fig. 1, being supported on a portion of pickup unit 10 constituting suitable carrying means for the conveyor.

Another line of connection between these assembled units is that of connecting brace 44 of frame 42 matching angle bar 82 of the base unit 11 constituting an additional pair of mating surfaces. At this contact, a bolt 92 fastens the base unit and the pickup unit together. In actual assembly, bolt 92 passes through bolt hole 83 in bar 82 and a hole 90 provided in the bar 44 to align with the hole 83, see Fig. 3. Also bolts 93 fasten the units at the contact between plates 40 and plates 78 which are provided with bolt holes to align with holes 91 on plates 40.

As shown in Fig. 3, a bolt 93 is preferably provided on each side of the harvester so that three bolts in all are used to maintain the units together.

When the units are thus assembled, the pickup unit driven gear 51 meshes in driving relation with the base unit idler gear 84 which in turn is driven by driving gear 94 mounted in base unit 11 on a driving shaft 96 which receives power from pulley 76 in well known manner not necessary to disclose since it forms no part of the present invention. By this means it will be seen that power is transmitted from driving shaft 96 to driven shaft 52 and to conveyor 46. This construction also has a feed roll 95 mounted on shaft 96 and driven thereby along with gear 94. The attachment of pickup unit 10 can be made in a matter of a few minutes with only a fraction of the effort required to connect the base unit and the pickup unit or gathering unit of previously known harvesters.

Figure 5:
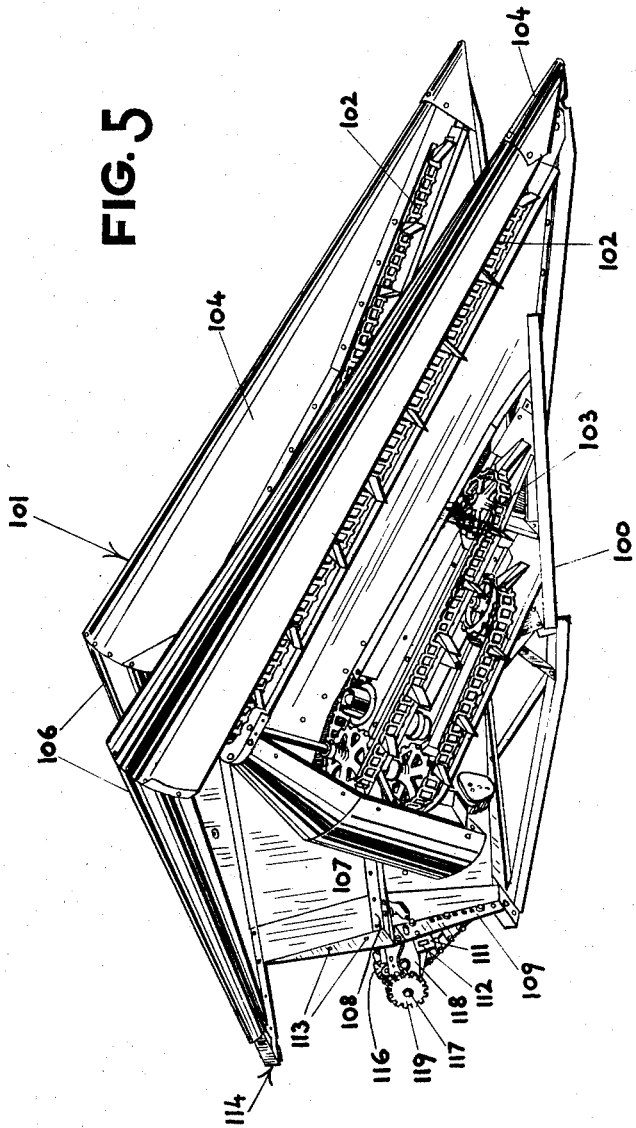
Fig. 5 is a perspective view of a different type of forage gathering unit.

A feature of this invention is the capability of interchanging forage gathering units with a minimum of time and effort. Thus, the pickup unit shown in Figs. 1 and 2 can be quickly detached from its position in Fig. 2 and replaced by the row crop gathering unit 101 of Fig. 5.

Unit 101 is best utilized for cutting corn stalks and passing them to the base unit. A frame 100 forms a base for the unit. There is also provided two laterally spaced pairs of gathering chains 102 and 103 to operate to maintain the corn stalks in an upright position as the harvester advances along the ground. The stalks are then passed between left and right hand stalkway side sheets 104. Sheets 104 extend upwardly and rearwardly to members 106 which form a continuation of sheets 104. Since this section of the unit is of a conventional nature, no further description is necessary.

Positioned upright and to the rear of unit 101 is a pair of housing sheets 107 with one sheet on each side of the harvester unit extending longitudinally thereof. An angle bar 108 extends therealong to support an angle plate 109 in an upright position on the rear end of the unit. Secured to plate 109 is an extension or flange plate 111 containing bolt hole 112. Further, plate 109 contains a pair of pin receiving holes 113 on the upper half thereof. A similar plate 109 is mounted on the opposite side of unit 101 in a similar manner. Extending rearwardly beyond members 106 is a frame 114 which is integral with unit 101 and is similar to frame 42 of Figs. 1, 2 and 3. Also, plates 109 are similar to plates 34.

A forage conveyor 116 projects beyond the rear plane of plates 109 and is mounted on a shaft 117 which is supported on a frame or carrying means 118. The conveyor is driven through a sprocket similar to that previously described on the pickup unit. A driven gear 119 is mounted on the end of shaft 117.

It should be understood that the row crop gathering unit 101 can be attached to base unit 11 with abovementioned idler gear 84 meshing with gear 119 to be in driving relation therewith. Thus, the assembly of unit 101 with base unit 11 would form a matching connection similar to that shown in Fig. 2 with conveyor carrying means 118 projecting into the opening defined by posts 78 as hereinbefore set forth.

While specific embodiments of this invention have been shown and described, it should be understood that changes can be made within the scope thereof. For example, while a specific number of alignment pins and bolts has been disclosed herein; it should be obvious that the number of pins and bolts, and the exact manner of connecting the base unit and the gathering unit can be varied in numerous ways within the scope of the invention, and therefore the invention should be limited only by the appended claims.

I claim:

1. In combination with a base unit including a forage chopping unit and a feed means therefor, said base unit having an engaging means thereon, a ground supported forage gathering unit having pick-up and conveying means thereon and having cooperative association with said chopping unit and feed means, said gathering unit having an engaging means thereon complemental with said first-mentioned engaging means, a driving gear on said base unit, a supporting member on said pick-up unit extending outwardly of said pick-up engaging means, a gear on said supporting member having driving connection with said pick-up and conveying means, said gear also having driving connection with said driving gear, and securing means interconnecting said engaging means.

2. Apparatus as set forth in claim 1 wherein the engaging means on the base unit comprises a face plate and the complemental engaging means on the gathering unit comprises a face plate complemental with the face plate on the base unit.

3. Apparatus as set forth in claim 2 including alignment pin means on one of the face plates and a mating alignment hole on the other of the face plates.

4. Apparatus as set forth in claim 1 wherein the base unit includes a frame mounting the base unit engaging means at the front end thereof, wherein the gathering unit includes a frame mounting the gathering unit engaging means at the rear end thereof, and wherein the base unit includes a drive shaft mounting the driving gear.

5. Apparatus as set forth in claim 1 wherein the conveying means on the forage gathering unit projects beyond the engaging means on the gathering unit so that when the securing means interconnects the engaging means the conveying means is positioned to deliver crop material to the feed means on the base unit.

6. Apparatus as set forth in claim 1 wherein the feed means on the base unit includes an endless conveyor and wherein the conveying means on the gathering unit includes an endless conveyor, and wherein the endless conveyors are positioned so that when the securing means interconnects the engaging means the conveyor on the gathering unit is in position to deliver crop material to the conveyor on the base unit.

7. Apparatus as set forth in claim 1 wherein the feed means on the base unit includes a pivot bar mounting a beater roll thereon.

8. Apparatus as set forth in claim 1 wherein the base unit includes means for tiltingly adjusting the position thereof.

References Cited in the file of this patent

UNITED STATES PATENTS

| | | |
|---|---|---|
| 1,039,490 | Coldwell | Sept. 24, 1912 |
| 1,428,194 | Von Meyenburg | Sept. 5, 1922 |
| 2,477,794 | Gehl | Aug. 2, 1949 |
| 2,651,162 | Whisler | Sept. 8, 1953 |
| 2,658,319 | Hansen | Nov. 10, 1953 |
| 2,661,585 | Hansen | Dec. 8, 1953 |
| 2,728,180 | Whisler | Dec. 27, 1955 |